(12) United States Patent
Panigrahi et al.

(10) Patent No.: US 10,919,475 B2
(45) Date of Patent: Feb. 16, 2021

(54) USE OF VEHICLE DYNAMICS TO DETERMINE IMPACT LOCATION

(71) Applicant: Ford Global Technologies, LLC, Dearborn, MI (US)

(72) Inventors: Smruti R. Panigrahi, Farmington Hills, MI (US); Jianbo Lu, Northville, MI (US); Sanghyun Hong, Canton, MI (US); Jonathan Scott, Chelmsford (GB); Dimitar P. Filev, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 194 days.

(21) Appl. No.: 16/085,385

(22) PCT Filed: Mar. 15, 2016

(86) PCT No.: PCT/US2016/022425
§ 371 (c)(1),
(2) Date: Sep. 14, 2018

(87) PCT Pub. No.: WO2017/160274
PCT Pub. Date: Sep. 21, 2017

(65) Prior Publication Data
US 2019/0126874 A1    May 2, 2019

(51) Int. Cl.
*B60R 21/0132* (2006.01)
*B60R 21/0136* (2006.01)

(52) U.S. Cl.
CPC ...... *B60R 21/0132* (2013.01); *B60R 21/0136* (2013.01)

(58) Field of Classification Search
CPC ............. B60R 21/013; B60R 21/0132; B60R 21/0136; B60Q 1/525; B60Q 9/008; G01S 13/931
See application file for complete search history.

(56) References Cited

U.S. PATENT DOCUMENTS 6,741,168 B2   5/2004   Webb et al.
7,359,821 B1   4/2008   Smith et al.
(Continued)

FOREIGN PATENT DOCUMENTS

| EP | 2261087 A1 * | 12/2010 | ......... B60R 21/0132 |
| GB | 2485971 A | 6/2012 | |
| KR | 20140134849 A | 11/2014 | |

OTHER PUBLICATIONS

Machine Translation of EP2261087A1 (Year: 2010).*

*Primary Examiner* — Anne Marie Antonucci
*Assistant Examiner* — Sahar Motazedi
(74) *Attorney, Agent, or Firm* — Frank MacKenzie; MacMillan, Sobanski & Todd, LLC

(57) ABSTRACT

Crash detection in a road vehicle includes determining an impact location. Acceleration and yaw rate are measured, and occurrence of an impact is detected by comparing a total acceleration to an impact threshold. An impact angle is determined according to an arctangent of a ratio of lateral and longitudinal accelerations. A center-of-gravity to impact distance is determined according to vehicle mass, moment of inertia, acceleration, and yaw rate. When the yaw rate is less than a yaw threshold and the impact angle is within a predetermined range of an integer multiple of 90°, then the impact location is determined in response to a projection of the impact distance selected according to signs of the accelerations. Otherwise, the impact location is determined in response to a projection of the impact distance selected according to signs of the accelerations and a sign of the yaw rate.

13 Claims, 12 Drawing Sheets

(56) References Cited

U.S. PATENT DOCUMENTS

| | | | |
|---|---|---|---|
| 7,725,216 B2 | 5/2010 | Kim | |
| 8,436,722 B2 | 5/2013 | Roh et al. | |
| 8,768,565 B2 | 7/2014 | Jefferies et al. | |
| 8,825,277 B2 | 9/2014 | McClellan et al. | |
| 9,002,554 B2 | 4/2015 | Chen | |
| 2003/0112133 A1* | 6/2003 | Webb | G07C 5/085 340/436 |
| 2007/0100521 A1 | 5/2007 | Grae | |
| 2007/0271105 A1 | 11/2007 | Gunderson et al. | |
| 2008/0201042 A1 | 8/2008 | Cuddihy et al. | |
| 2010/0017066 A1* | 1/2010 | Lu | B60T 8/17554 701/45 |
| 2011/0006890 A1* | 1/2011 | Le | B60R 21/0132 340/440 |
| 2013/0124035 A1* | 5/2013 | Doerr | B60R 21/0133 701/32.2 |
| 2013/0320654 A1* | 12/2013 | Clark | B60R 21/0132 280/735 |
| 2014/0024334 A1 | 1/2014 | Berry et al. | |
| 2014/0163848 A1* | 6/2014 | Tamir | G07C 5/085 701/117 |
| 2014/0375446 A1* | 12/2014 | Wanami | G08G 1/205 340/436 |

\* cited by examiner

USE OF VEHICLE DYNAMICS TO DETERMINE IMPACT LOCATION

BACKGROUND OF THE INVENTION

The present invention relates in general to automotive crash detection, and, more specifically, to detecting the direction of an impacting body's trajectory at the point of impact with a host vehicle and the location on the host vehicle of that point of impact.

Vehicle crash detection is a well-developed technology in the context of passive restraint systems which deploy during a crash in order to protect the vehicle occupants. Specialized sensors and robust detection algorithms provide a high reliability in detecting the onset of a crash that has a sufficient severity to automatically activate a passive restraint.

A typical crash sensing system may be comprised of an array of accelerometers, for example. Longitudinal and lateral acceleration sensor signals from the accelerometers can be generated within or communicated to a Restraints Control Module (RCM) which makes a deployment decision. Accelerometers mounted in the RCM have detection ranges from about −50 g to about +50 g. Satellite accelerometers remotely located in the front and sides of the vehicle typically have ranges from about −250 g tom about +250 g. Light to moderate impacts involving lower levels of acceleration cannot be reliably detected using the existing accelerometers. However, there would be benefits to having an ability to detect light impacts, i.e., when the impact severity is less than what the RCM module uses to initiate a restraint deployment.

Although light impacts between vehicles do not cause significant damage to the driver or passenger directly, they could begin a chain of post impact events which can lead to undesired outcomes such as further impacts or rollovers. Therefore, the detection and recording of occurrences of light impact collisions may of interest to vehicle owners, vehicle fleet operators, law-enforcement personnel, and insurance providers. This invention discloses techniques and systems for detecting light impacts to enable many different kinds of reactions such as modified vehicle control, the real-time alerting of third parties (e.g., insurance, fleet, and law enforcement agencies), and the recording/storage of incident information in the vehicle for later use by fleet operators and law enforcement for accident reconstruction.

When an impact occurs, it would be useful to automatically determine in real time not only the fact that an impact has occurred but also a direction of impact and the location along the outer perimeter of the vehicle where the impact has occurred. This information may be useful not only for reporting of incident details for accident reconstruction by crash investigators but also for real time control of vehicle systems including adapting or preparing passive restraint systems to deploy in a manner consistent with a developing situation or adjusting performance of powertrain systems for maintaining control and stability of the vehicle, for example.

SUMMARY OF THE INVENTION

In one aspect of the invention, a technique is provided for crash detection in a road vehicle which includes determining the location of an impact along an outer perimeter of the vehicle. Lateral acceleration, longitudinal acceleration, and yaw rate are measured during operation of the vehicle, wherein the lateral and longitudinal accelerations define a total acceleration. Occurrence of an impact is detected by comparing a total acceleration to an impact threshold. An impact angle is determined according to an arctangent of a ratio of the lateral and longitudinal accelerations. A center-of-gravity to impact distance is determined according to a mass of the vehicle, a moment of inertia of the vehicle, the measured accelerations, and the yaw rate. When the yaw rate is zero or less than a calibrated value and the impact angle is within a predetermined range of an integer multiple of 90°, then the impact location is determined in response to a projection of the impact distance selected according to signs of the lateral and longitudinal accelerations. Otherwise, the impact location is determined in response to a projection of the impact distance selected according to signs of the lateral and longitudinal accelerations and a sign of the yaw rate. As used herein, impact location typically means the coordinates (relative to the center-of-gravity of the vehicle) on the perimeter of vehicle where an impacting body strikes the vehicle (relative to the center-of-gravity of the impacting object).

DETAILED DESCRIPTION OF PREFERRED EMBODIMENTS

Figure 1:
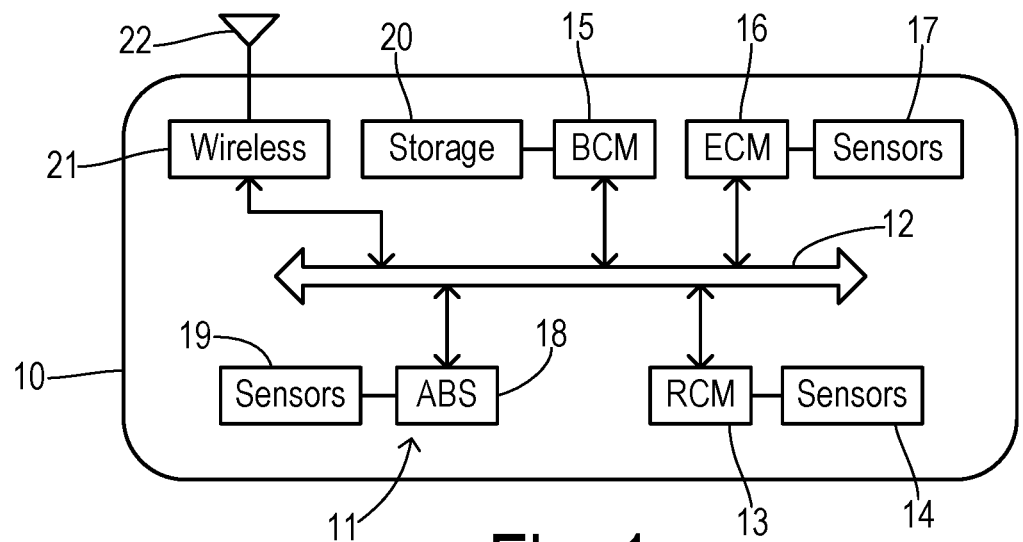
FIG. 1 is a block diagram of a vehicle with an impact detection and recording system of the invention.

Referring to FIG. 1, a vehicle 10 (such as a gas, electric, or hybrid automobile or truck) includes a controller network 11 having various controller modules, sensors, and a multiplex bus 12 (e.g., a CAN bus) for transmitting data signals between the various modules and sensors. Controller modules that may be involved in implementing the present invention include a restraints control module (RCM) 13 with associated sensors 14 such as accelerometers. The passive restraint system would further include actuators such as air bags (not shown) disposed throughout vehicle 10 and connected to RCM 13.

A body control module (BCM) 15, which is coupled to bus 12, is commonly present in a vehicle electrical architecture for performing general vehicle functions. BCM 15 provides one advantageous location for implementing the light impact detection of the invention. Controller network 11 further includes a powertrain controller, shown in this embodiment as an engine control module (ECM) 16 which is coupled to various powertrain sensors 17 such as a speed sensor. The vehicle may also have a traction control module comprised of an antilock brake system (ABS) module 18 connected to associated sensors such as wheel speed sensors.

BCM 15 may include, or is coupled to, a nonvolatile memory or storage 20 to be used in connection with crash detection and reporting. For purposes of accessing remote data and reporting impact events in real-time to remote systems (e.g., law enforcement or insurance companies), a wireless communication module 21 may also be connected with bus 12 to work in cooperation with BCM 15. An antenna 22 is connected to wireless communication module 21 for establishing a data communication channel (e.g., a cellular data connection).

The purpose of the light impact detection function is to detect as quickly as possible an impact that, although not sufficiently severe to trigger deployment of a passive restraint, could create vehicle instability or significantly alter the vehicle's initial kinetic energy (either rotational or linear momentum). This function is not intended to deploy airbags or any other passive restraints. However, sensitivity to impacts needs to be much higher than what is currently used in connection with the restraints controls.

This invention, however, is not limited to light-impact events only, but is intended to detect impact locations for all type of incidents including severe impacts. By increasing the sampling time of the algorithm (i.e., by increasing the number of times the algorithm is evaluated per second using the high-speed CAN signals as input to the algorithm), the invention will allow the determination of impact locations and directions for any type of events not involving rollover.

Impact detection may be done as shown in copending U.S. application Ser. No. 16/085,374, entitled "Light Impact Detection for Vehicle Using Low Computation Overhead." filed concurrently herewith, which was granted as U.S. Pat. No. 10,417,913, and which is hereby incorporated by reference in its entirety. In summary, the light impact detection function uses progressive monitoring stages which initially may suspect and then confirm the occurrence of an impact. Vehicle acceleration and yaw rate are measured, and possibility of an impact is recognized using the following procedure:

```
If √(aₓ (z₂)² + aᵧ (z₂)²) > AccelerationCalibration1 OR
       ((ω_z2 > YawCalibration) AND
        √(aₓ (z₂)² + aᵧ (z₂)²) > AccelerationCalibration2 ) {
    InImpact[z₂] = 1;
}
Else {
    InImpact[z₂] = 0;
}
``` where $a_x$ is longitudinal acceleration, $a_y$ is lateral acceleration, z is a time index wherein times $z_1$, $z_2$, and $z_3$ are consecutive samples taken at a time step interval $\Delta T$ and where $z_2$ is the current sample and $z_1$ is the previous sample, and InImpact is a flag used to detect a duration for which the condition remains true.

When the ImImpact flag remains at a value of 1 for a predetermined duration then an impact is suspected and monitoring of the vehicle dynamics is heightened. For example, if the last three consecutive InImpact flags are 1, then an Impact_Suspected flag changes from 0 to 1. In the following pseudo-code, $z_1$, $z_2$, and $z_3$ are the last three samples and the consecutive impact flags are InImpact[$z_1$], InImpact[$z_2$], and InImpact[$z_3$]:

```
if InImpact[z₁]== 1 && InImpact[z₂]== 1 && InImpact[z₃]== 1
    Impact_Suspected[z₃]= 1;
else
    Impact_Suspected[z₃]= 0;
End
```

When Impact_Suspected[$z_3$] equals 1, then various dynamic behaviors indicative of an impact are monitored in an attempt to confirm whether or not an impact is actually occurring. The dynamic behaviors may include checking for threshold values of the skidding of the front and rear tires, longitudinal and lateral velocity changes, continued excessive acceleration or yaw rate, and lane departure speed, for example. More specifically, an Impact_Confirmed flag may be set in response to the following vehicle dynamic behaviors.

One dynamic behavior is Change in Longitudinal Velocity. This is calculated by integrating the longitudinal acceleration $a_x$ as follows:

$$LongVchange = \int_0^t a_x dt.$$

When an impact is suspected, LongVchange is checked against a threshold value SpeedChangeCalibration1. When the condition abs(LongVchange)>SpeedChangeCalibration1 is satisfied, then the Impact_Confirmed flag changes from 0 to 1.

Another dynamic behavior is Change in Lateral Velocity. This is calculated by integrating the lateral acceleration $a_y$:

$$LatVchange = \int_0^t a_y dt.$$

When an impact is suspected, LatVchange is checked against a threshold value SpeedChangeCalibration2. When the condition abs(LatVchange)>SpeedChangeCalibration2 is satisfied, then the Impact_Confirmed flag changes from 0 to 1.

Another dynamic behavior for confirming an impact is Rate of Side-Slip Due to Yaw Motion and Lateral Acceleration. This flag checks whether the front or the rear tires exceed a threshold predefined sideslip value. The computations of the sideslips are done using the following physics based model. First, the lateral acceleration $a_{lateral}$ is computed using the measured sensor data $a_y$, $\omega_z$, and $v_x$ such that $$a_{lateral} = a_y - \chi_z \times v_x.$$

Then the lateral velocity is $$v_{lateral} = \int_0^t a_{lateral} dt.$$

The lateral velocity due to angular yaw rate, $\omega_z$, is $$v_{angularFT} = \omega \times d_{FT} \text{ for front tires, and}$$

$$v_{angularRT} = \omega \times d_{RT} \text{ for rear tires.}$$

The total lateral velocities of the front and the rear tires are $$v_{lateralFT} = v_{lateral} + v_{angularFT} \text{ for front tires, and}$$

$$v_{lateralRT} = v_{lateral} - v_{angularRT} \text{ for rear tires.}$$

So, the sideslip ratios for the front tire and the rear tire are $$SideSlip_{FT} = v_{lateralFT}/v_x \text{ for front tires, and}$$

$$SideSlip_{RT} = v_{lateralRT}/v_x \text{ for rear tires.}$$

Then the impact confirmation is obtained by using predefined threshold values, SideSlipCalibration1 and SideSlipCalibration2, of the side slip ratios for the front and the rear axles.

For the front axle,

```
if abs(SideSlipFT[z])> SideSlipCalibration1
    Impact_Confirmed[z]= 1
else
    Impact_Confirmed[z]= 0;
end
``` and for the rear axle

```
if abs(SideSlipRT(z))> SideSlipCalibration2
    Impact_Confirmed[z]= 1
else
    Impact_Confirmed[z]= 0;
end.
```

Another dynamic behavior for confirming an impact is Lane-Departure Acceleration Threshold. The lane departure acceleration is calculated by multiplying the yaw rate and the vehicle longitudinal velocity. If this lateral acceleration exceeds a threshold value AccelerationCalibration3 then an impact is confirmed as follows:

```
if abs(ω_z[z] V_x[z]) > AccelerationCalibration3
    Impact_Confirmed[z] = 1
else
    Impact_Confirmed[z] = 0;
end.
```

Yet another behavior for confirming an impact is impact duration wherein the Impact_Suspected flag is integrated over time, denoted by InImpactTime. An impact is confirmed when Impact_Suspected flag is activated and InImpactTime exceeds a pre-defined threshold value ImpactDurationCalibration1.

When any of the above conditions is satisfied, the value of the Impact_Confirmed flag is set to 1. Details concerning the impact are stored in a memory (i.e., black box) and an alert may be sent to a remote system or authority (e.g., law enforcement or insurance company). The detected impact can also be used to modify vehicle powertrain operation or to modify performance of a passive restraint system.

Figure 2:
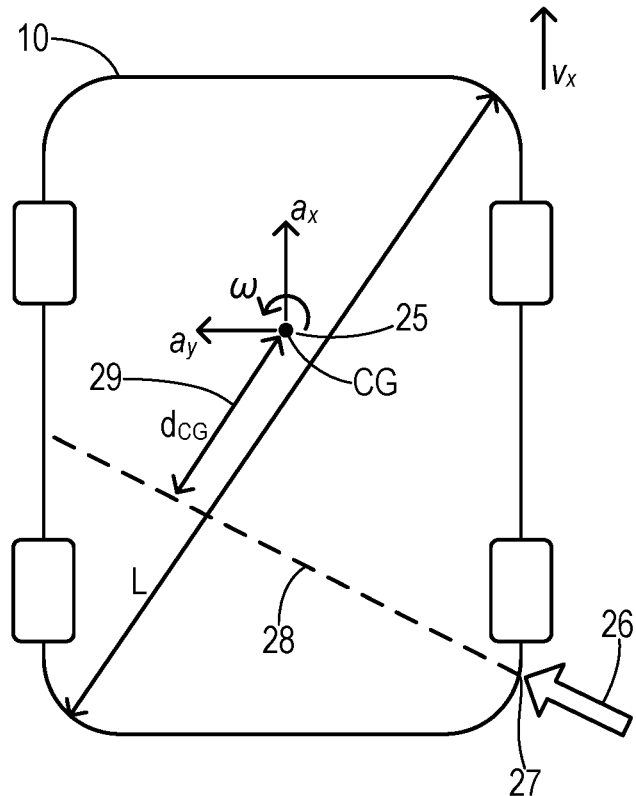
FIG. 2 is a diagram depicting a vehicle center-of-gravity, a point of impact, and an impact distance.

The present invention uses acceleration and yaw rate in order to geometrically identify an angle and location of an impact. As shown in FIG. 2, vehicle 10 has a center of gravity (CG) 25, typically slightly forward from the center of vehicle 10. An impacting object 26 strikes vehicle 10 at an impact point 27 when moving along a line of impact 28. An impact distance 29 is the shortest distance from CG 25 to line 28, and is designated $d_{CG}$. Distance $d_{CG}$ can be calculated based on the dynamic response of vehicle 10 to the impact using a longitudinal acceleration $a_x$, a lateral acceleration $a_y$, and a yaw rate $\omega$ acting at CG 25 as shown in FIG. 2. In particular, knowing the total magnitude of the acceleration and the effect that acceleration has on the yaw rate, the "lever arm" over which the impact influences the yaw rate can be determined. In addition, the angle of the line of impact can be inferred based on a ratio of longitudinal acceleration $a_x$ and lateral acceleration $a_y$. Using distance $d_{CG}$ and the angle of impact, the x and y coordinates on the vehicle where the impact occurred is inferred using geometry. FIG. 2 also indicates a vehicle forward velocity $V_x$.

Impact distance $d_{CG}$ is preferably calculated from the moment of inertia of the vehicle using the following formula:

$$d_{CG} = \frac{J\left(\frac{\omega[z_2] - \omega[z_1]}{t[z_2] - t[z_1]}\right)}{m\sqrt{a_x[z_2]^2 + a_y[z_2]^2}}$$

where in is the mass of the vehicle and J is the moment of inertia about CG 25. Impact distance is computed only when the total acceleration exceeds a predetermined threshold so that the above calculation does not involve dividing by zero.

To reduce noise in the computation (due to inherent noise in acceleration and yaw-rate signals received over a multiplex bus) and for more accurate estimation of the impact distance, a recursive least square (RLS) algorithm is preferably used in computing the impact distance from CG 25.

The impact angle is preferably found using the inverse tangent of the ratios of the lateral and longitudinal accelerations of the vehicle as shown below, $$\text{Impact Angle: } \theta = \tan^{-1}\left|\frac{a_y}{a_x}\right|$$

where $$0 \le \theta \le \frac{\pi}{2}.$$

Figure 3:
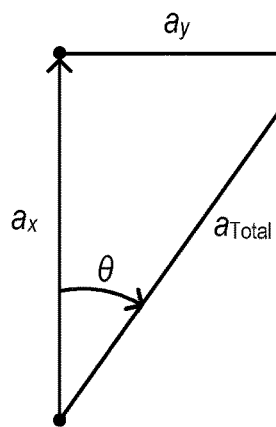
FIG. 3 shows relationships between lateral acceleration, longitudinal acceleration, total acceleration, and impact direction.
Figure 4:
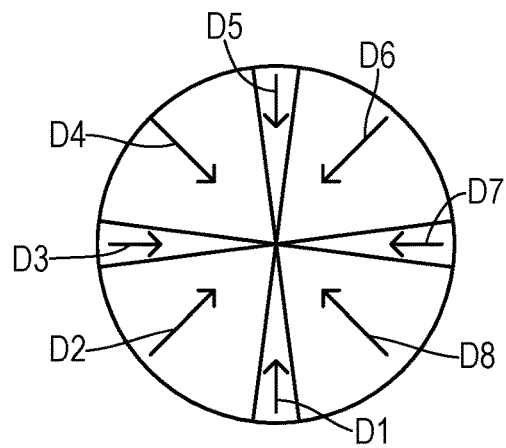
FIG. 4 is a diagram showing quadrants useful for representating of an impact direction.

As shown in FIG. 3, impact angle θ is calculated with respect to the forward direction of the vehicle (i.e., the angle between total acceleration and longitudinal acceleration). Since the arctangent returns a value between 0 and π/2 radians (i.e., 0° and 90°) regardless of the signs of the lateral and longitudinal accelerations, a final calculated impact angle further depends on those signs. More specifically, the signs of the lateral and longitudinal accelerations are used to classify an impact angle according to quadrants as shown in FIG. 4. A forward vehicle direction is at the top of FIG. 4. Impacts occurring at close to a right angle on the back, left side, front, or right side of the vehicle are identified by narrow quadrants D1, D3, D5, and D7, respectively. For convenience, these directions can also be referred to as south, west, north, and east, respectively. Intermediate impact angles fall into wider quadrants referred to as a "southwest" direction designated D2, a "northwest" direction designated D4, a "northeast" direction designated D6, and a "southeast" direction designated D8.

Figure 7:
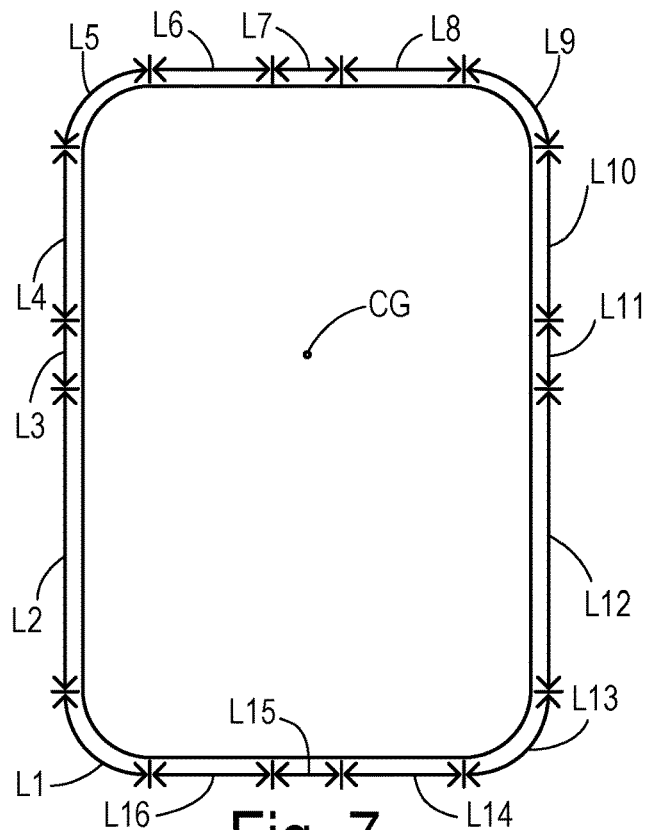

In order to reduce data traffic when sending wireless crash reports over the "cloud" and to reduce onboard memory usage, the reporting and storage of crash data may use the quadrants shown in FIG. 4 instead of the more precise impact angle as calculated above. The x and y coordinates where the impact occurs are calculated with good spatial resolution below. However, to again save data traffic and memory requirements, an impact location can also be reported/stored using regions L1-L16 as shown in FIG. 7.

Figure 5:
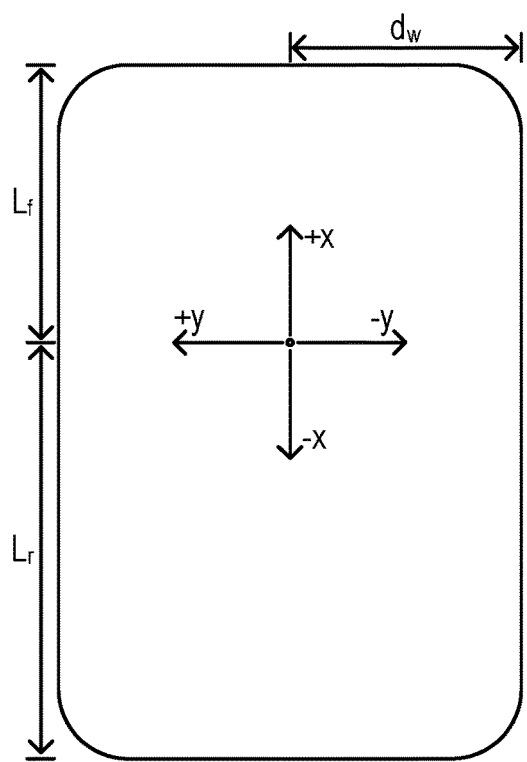
FIGS. 5-7 are diagrams showing definitions for representing various dimensions of a vehicle.
Figure 6:
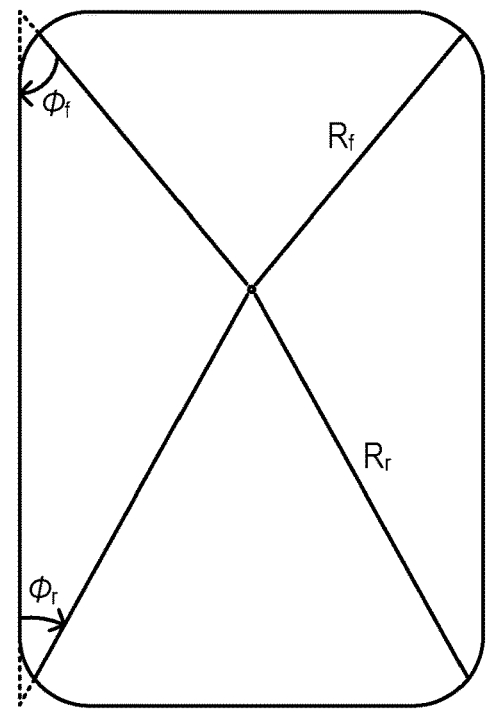
Figure 8:
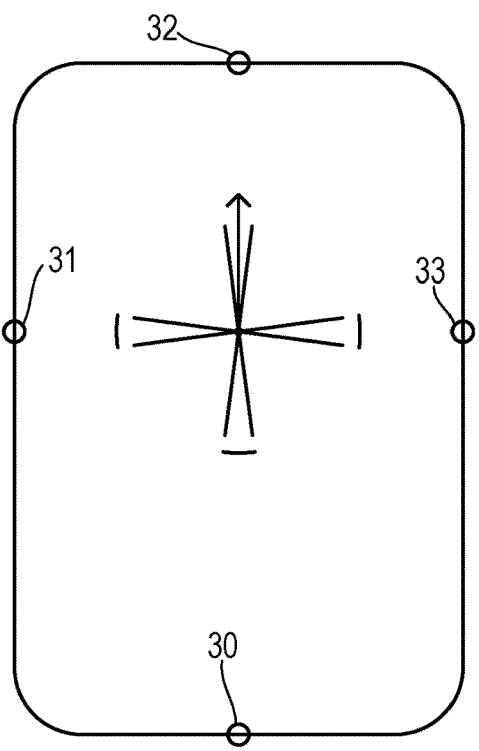
FIG. 8 represents a special case for finding an impact location when yaw rate is low and the impact direction is at or near a right angle.

Variables used in the impact location calculation according to a preferred embodiment include the following, as shown in the indicated Figures:
Half-width of the vehicle: $d_W$ (FIG. 5)
Estimated impact distance from the CG: $d_{CG}$ (FIG. 2)
Distance from CG to the front and rear end of the vehicle: $L_f$; $L_r$ (FIG. 5)
Distance from CG to the headlight and taillight of the vehicle: $R_f$; $R_r$ (FIG. 5)
Impact angle (between 0 and π radians): θ
Angle made by a line connecting the front headlight and rear taillight to CG with the side of the vehicle (between 0 and π radians): $\phi_f$; $\phi_r$ (FIG. 6)
Possible x-coordinates for impact: $x_1$ or $x_2$
Possible y-coordinates for impact between the front end and CG: $y_{f1}$ or $y_{f2}$
Possible y-coordinates for impact between the rear end and CG: $y_{r1}$ or $y_{r2}$ As a first step in determining an impact location, the invention checks for a special case in which the impact direction coincides with one of the ordinal directions (i.e., D1, D3, D5, or D7) and a yaw rate generated by the impact is below a threshold value. The low yaw rate indicates that the trajectory of impact intersects with the center of gravity (i.e., generates little or no torque around the CG). Since the impact occurs at a right angle, the location of impact can thus be narrowed down to one of the four locations at the ordinal directions from the CG, shown in FIG. 8 at coordinates 30, 31, 32, or 33. Moreover, the exact point can be identified based on the impact direction as identified by the signs of lateral and longitudinal acceleration. For example, if longitudinal acceleration is positive (i.e., greater than a threshold) then a rear impact has occurred at coordinate 30. In the event that either yaw rate is not below the threshold or impact angle is not close to zero or 90°, then additional geometric analysis is employed to determine the impact location.

Figure 9:
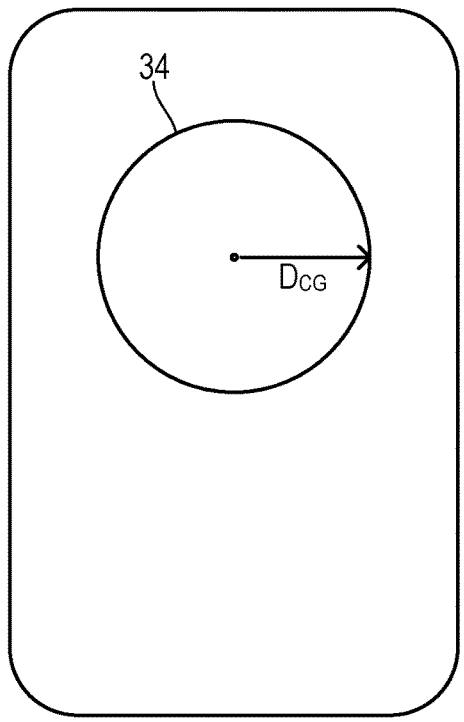
FIG. 9 is a diagram showing a distance from a center-of-gravity to an impact bearing or heading.
Figure 10:
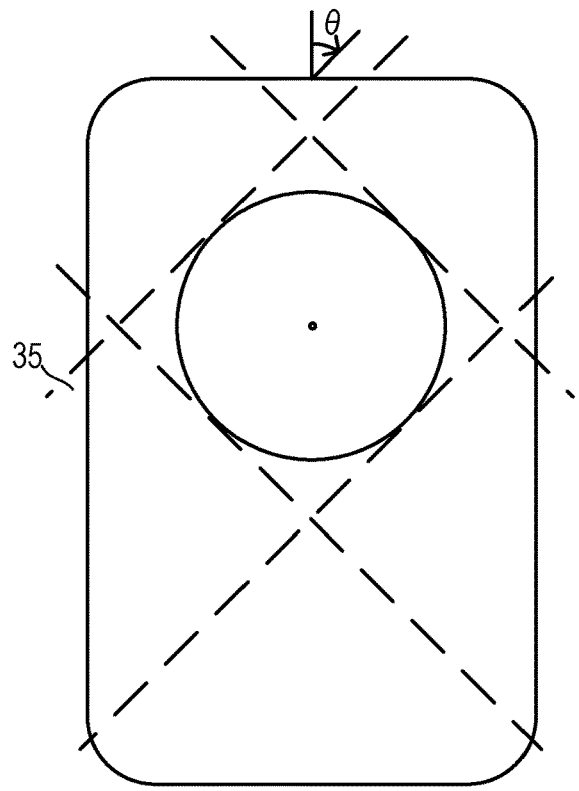
FIG. 10 is a diagram showing a combination of the impact direction and the center-of-gravity to impact distance.
Figure 11:
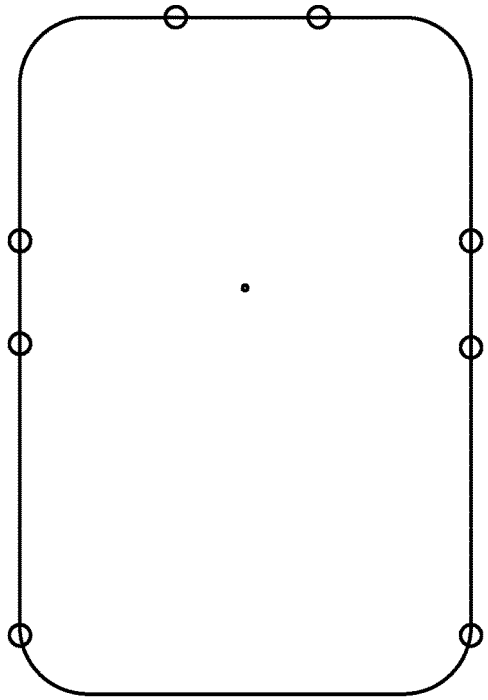
FIG. 11 is a diagram showing the possible impact locations consistent with the combination in FIG. 10.
Figure 12:
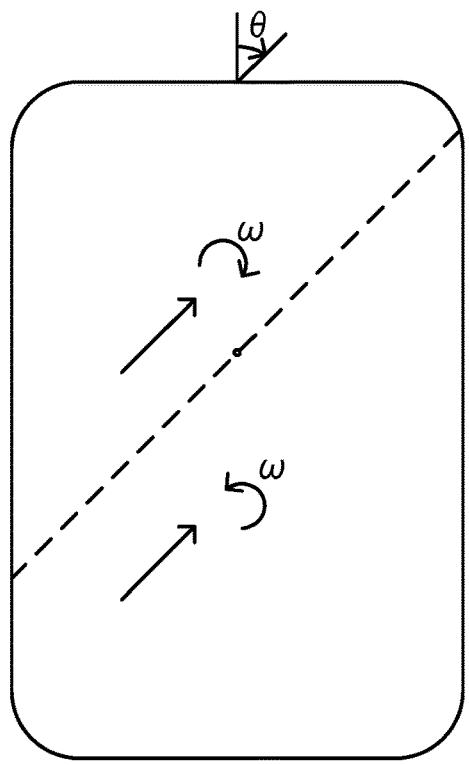
FIG. 12 depicts a relationship between the sign of the yaw rate and possible impact locations consistent with the yaw rate.

FIG. 9 depicts a circle 34 of radius $d_{CG}$ around the center of gravity using $d_{CG}$ as calculated above. Since the trajectory of the impacting object forms a tangent to circle 34 and since the impact angle θ is calculated as shown above, then there are four potential impact trajectories 35-38 (shown in FIG. 10) to consider. The intersections of the trajectories with the outside surface of the vehicle (shown in FIG. 11) generate potential x and y coordinates where the impact could have occurred (and the region L, if desired). Yaw rate and other factors are used to identify the actual trajectory and to select the proper coordinates. For instance, as shown in FIG. 12, two potential trajectories acting from opposite sides of the center of gravity create a yaw rate having opposite signs. Therefore, the sign of the yaw rate half of the potential trajectories. Together with the signs of the lateral and longitudinal accelerations, all but one of the trajectories is eliminated.

The invention uses various geometric projections wherein impact distance is projected according to axes/dimensions of the vehicle using the angle of impact. Variables representing various projections to be used in the analysis are as follows:

$$R_{fs} = R_f|\sin(\theta - \phi_f)|$$

$$R_{rs} = R_r|\sin(\theta - \phi_r)|$$

$$R_{fs+} = R_f|\sin(\theta + \phi_f)|$$

$$R_{rs+} = R_r|\sin(\theta + \phi_r)|$$

$$L_{fs} = L_f|\sin(\theta)|$$

$$L_{rs} = L_r|\sin(\theta)|$$

$$d_{Wc} = d_W|\cos(\theta)|$$

$$d_{Ws} = d_W|\sin(\theta)|$$

Figure 13:
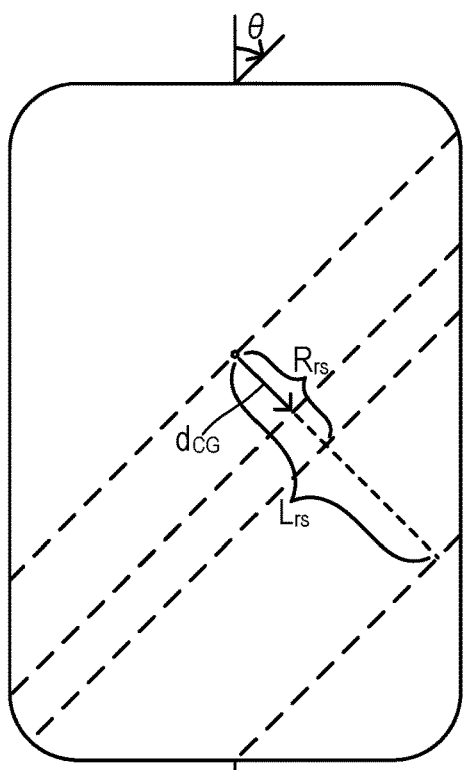
FIG. 13 shows geometric projections based on an impact angle.

By way of example, FIG. 13 shows projections $R_{rs}$ and $L_{rs}$ obtained by projecting $d_{CG}$ onto lines at angle θ from a rear corner of the vehicle and a rear center of the vehicle. More specifically, the projections include distances from a center-of-gravity to a vehicle front, a vehicle rear, a vehicle side, and vehicle corners, and dimensions for determining the projections include angles defined by lines between the vehicle side and the impact direction and between the center-of-gravity and the vehicle corners.

The possible coordinate locations of impact on the vehicle are then computed using the following derivations.

$$x_1 = \left|\frac{d_{wc} - d_{CG}}{\sin(\theta)}\right|$$

$$x_2 = \left|\frac{d_{wc} + d_{CG}}{\sin(\theta)}\right|$$

$$y_{f1} = \left|\frac{L_{fs} - d_{CG}}{\cos(\theta)}\right|$$

$$y_{f2} = \left|\frac{L_{fs} + d_{CG}}{\cos(\theta)}\right|$$

$$y_{r1} = \left|\frac{L_{rs} - d_{CG}}{\cos(\theta)}\right|$$

$$y_{r2} = \left|\frac{L_{rs} + d_{CG}}{\cos(\theta)}\right|$$

Depending on the acceleration, yaw-rate, and the direction of impact, a coordinate and its sign (positive or negative) are chosen from the above list of x and y coordinates.

Figure 14:
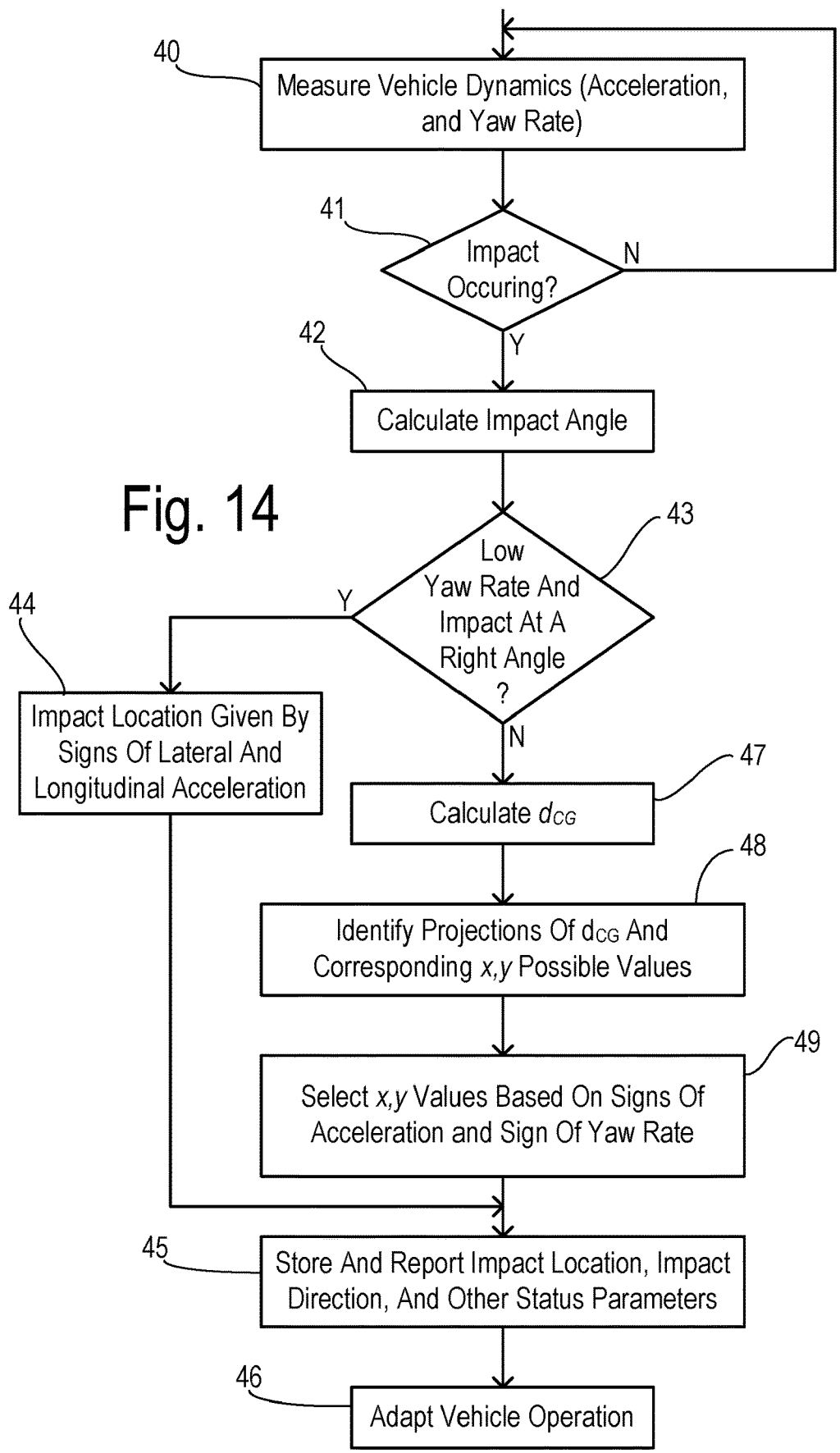
FIG. 14 is a flowchart showing one preferred method of the invention.

FIG. 14 summarizes a preferred method of the invention. In step 40, parameters representative of vehicle dynamics are measured including lateral and longitudinal acceleration and yaw rate. The vehicle dynamics measurements are inspected in step 41 to determine whether an impact is occurring. If not, the measurements continue to be collected at step 40. When an impact is occurring, an impact angle is calculated in step 42, e.g., using the arc tangent of a ratio of the lateral to the longitudinal acceleration. A check is performed in step 43 to determine whether there is a low yaw rate and whether the impact has occurred at nearly a right angle. If so, then the impact location is given in step 44 according to the signs of the lateral and longitudinal acceleration and the corresponding location coordinates at the vehicle surface placed at a right angle to the center of gravity of the vehicle. In step 45, the impact location, impact angle, and other vehicle status parameters are stored and reported (e.g., by wireless transmission to a remote accident monitoring database). The controller network preferably encodes the impact data according to a location-direction-yaw code for providing a low transmission overhead. In step 46, vehicle operation may optionally be adapted (i.e., modified) in view of the determined impact location and direction. For example, when the vehicle includes a passive restraint system for deploying a restraint to protect an occupant of the vehicle, deployment of the restraint may be adapted in response to the impact location (assuming the impact severity increases to a magnitude that triggers deployment).

When the special case is not detected in step 43, then geometric analysis is used to determine impact location by first calculating an impact distance $d_{CG}$ in step 47. In step 48, projections of the impact distance are identified, and corresponding possible values of the x and y coordinates are determined. In step 49, the actual x and y values are selected based on the signs of the longitudinal and lateral accelerations and the sign of the yaw rate. The thresholds used to detect the signs are defined as: $\varepsilon_x$ corresponding to the x-acceleration ($a_x$), $\varepsilon_y$ corresponding to the y-acceleration ($a_y$), $\varepsilon_{107}$ corresponding to the yaw rate ($\omega$), and $\varepsilon_\theta$ corresponding to the impact angle ($\theta$).

FIGS. 15-27 further delineate the analysis according to all of the potential circumstances for the acceleration and yaw rate values.

For determining when lateral or longitudinal accelerations or yaw rate is approximately zero, one or more thresholds denoted $\varepsilon_x$, $\varepsilon_y$ and $\varepsilon_\omega$ are defined as calibratable numbers close to zero (e.g., $\varepsilon_x=0.1$). Thus, wherever the absolute value of longitudinal acceleration $a_x$ is less than threshold $\varepsilon_x$ (i.e., $|a_x| \geq \varepsilon_x$), then the total acceleration is almost all a lateral acceleration (i.e., D3 or D7). Whenever the absolute value of yaw rate $\omega$ is less than threshold $\varepsilon_\omega$ (i.e., $|\omega| \leq \varepsilon_\omega$), then the impact trajectory coincides with the center of gravity (i.e., $d_{CG} \approx 0$).

Figure 15:
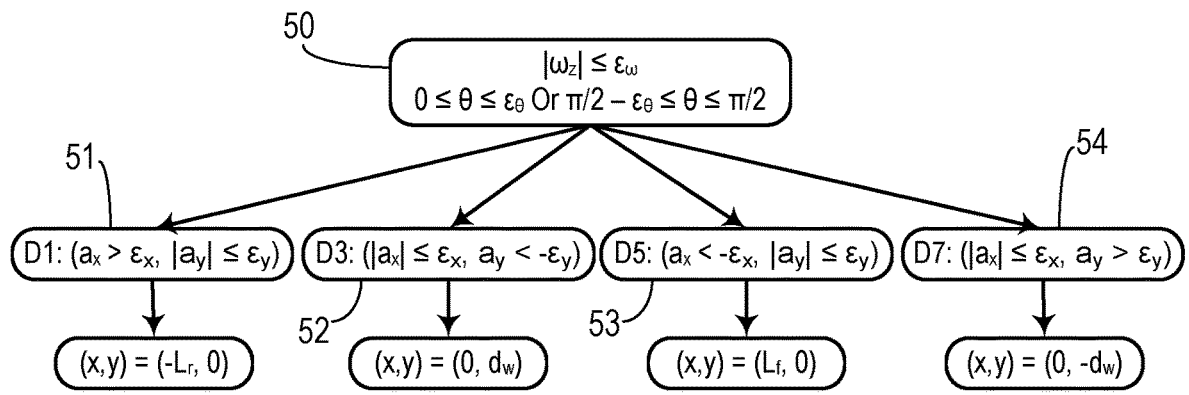
FIG. 15 is a decision tree for identifying coordinates of an impact location in the special case of FIG. 8.

FIG. 15 shows the special case which is detected in block 50 whenever yaw rate is about zero (i.e., $|\omega| \leq \varepsilon_\omega$) and impact angle is about 0 (as determined by angle $\theta$ being between 0 and $\varepsilon_\theta$) or about $\pi/2$ radians (as determined by angle $\theta$ being between $\pi/2-\varepsilon_\theta$ and $\pi/2$). When the special case is detected, then the quadrant (D1, D3, D5, or D7) of the total acceleration is determined in blocks 51-54 according to the sign of whichever of the longitudinal or lateral acceleration is larger than threshold $\varepsilon_x$ or $\varepsilon_y$, respectively. Based on the sign of the acceleration, the x and y coordinates of the impact location are defined as shown in FIG. 15.

Figure 19:
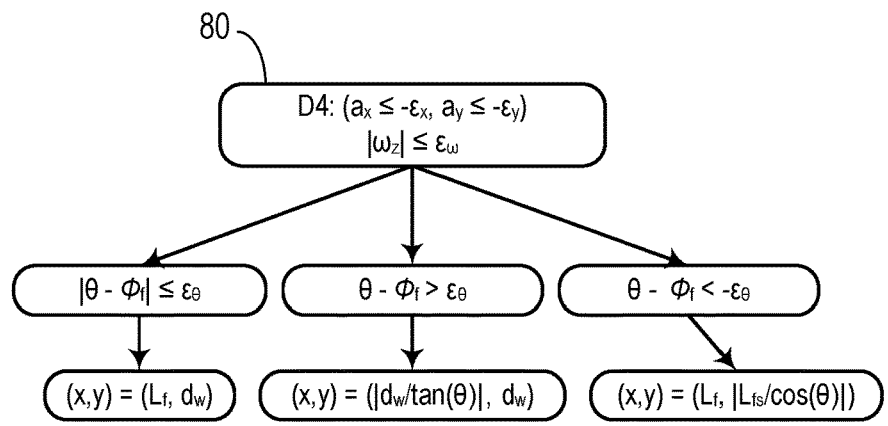
FIG. 19 is a decision tree for identifying coordinates of an impact location in a northwest quadrant when yaw rate is close to zero.
Figure 20:
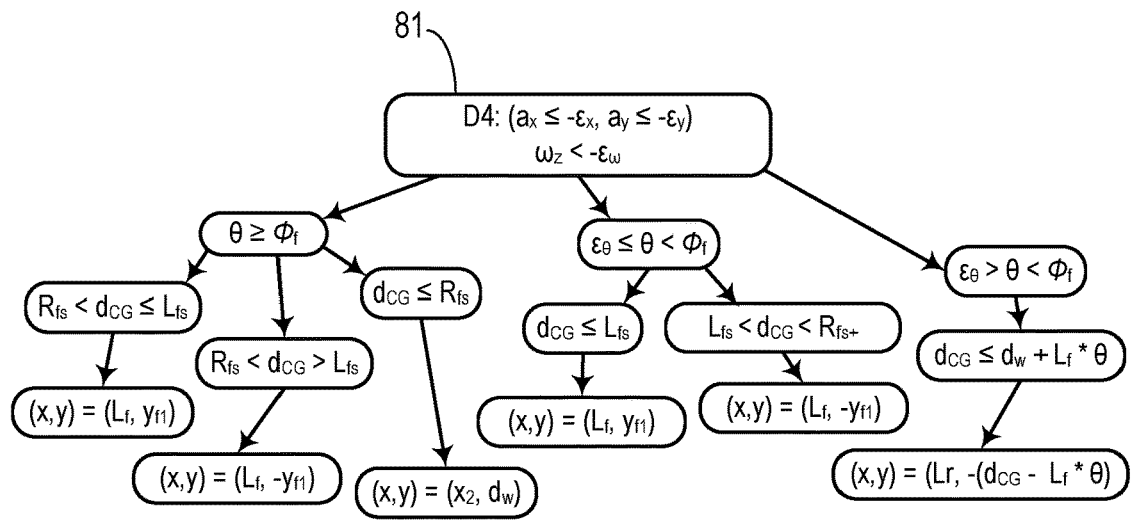
FIG. 20 is a decision tree for identifying coordinates of an impact location in a northwest quadrant when yaw rate is negative.
Figure 22:
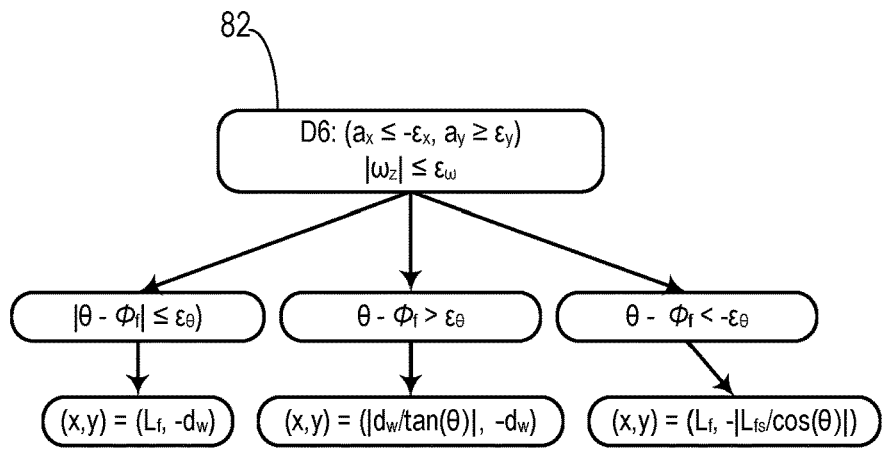
FIG. 22 is a decision tree for identifying coordinates of an impact location in a northeast quadrant when yaw rate is close to zero.
Figure 21:
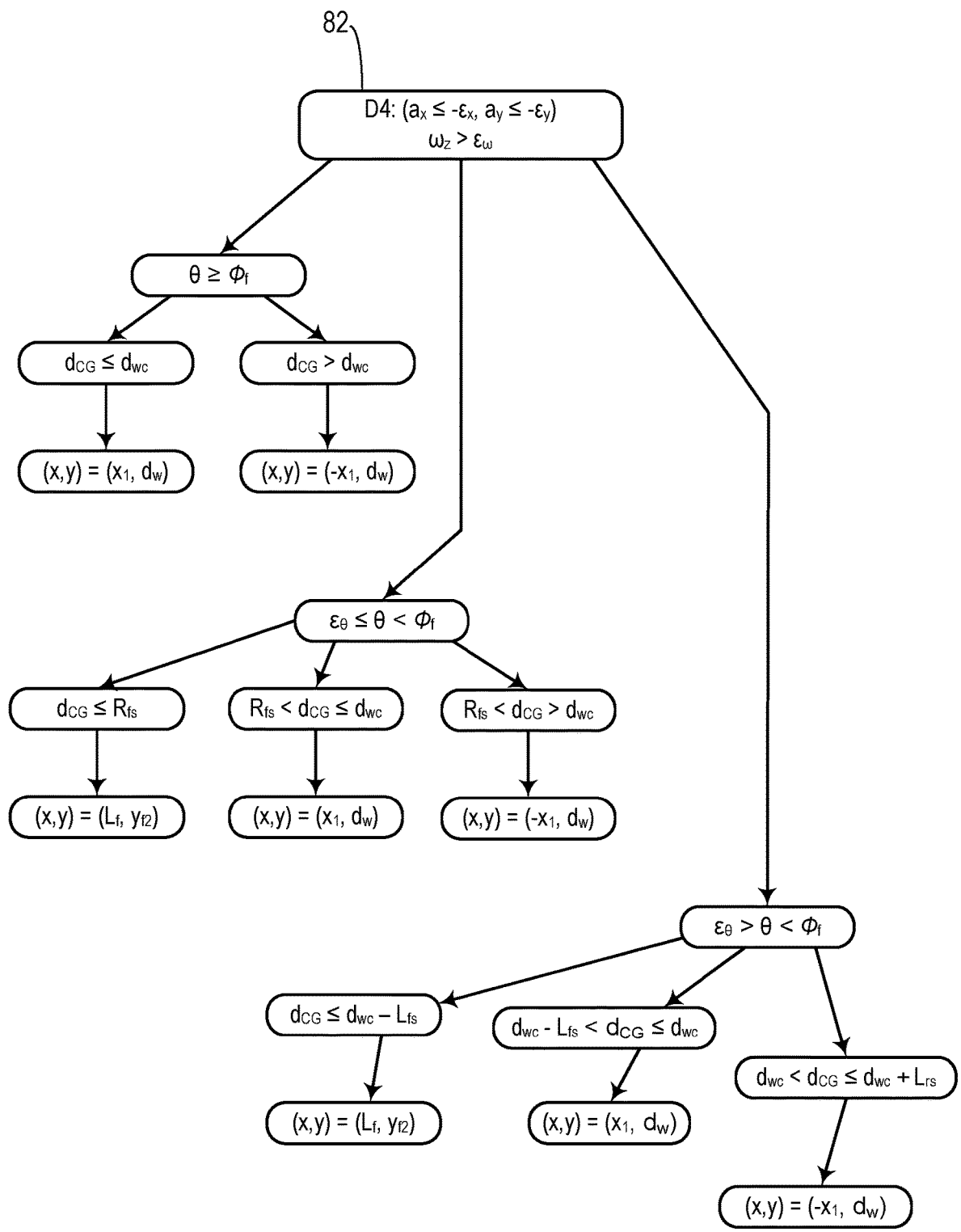
FIG. 21 is a decision tree for identifying coordinates of an impact location in a northwest quadrant when yaw rate is positive.
Figure 23:
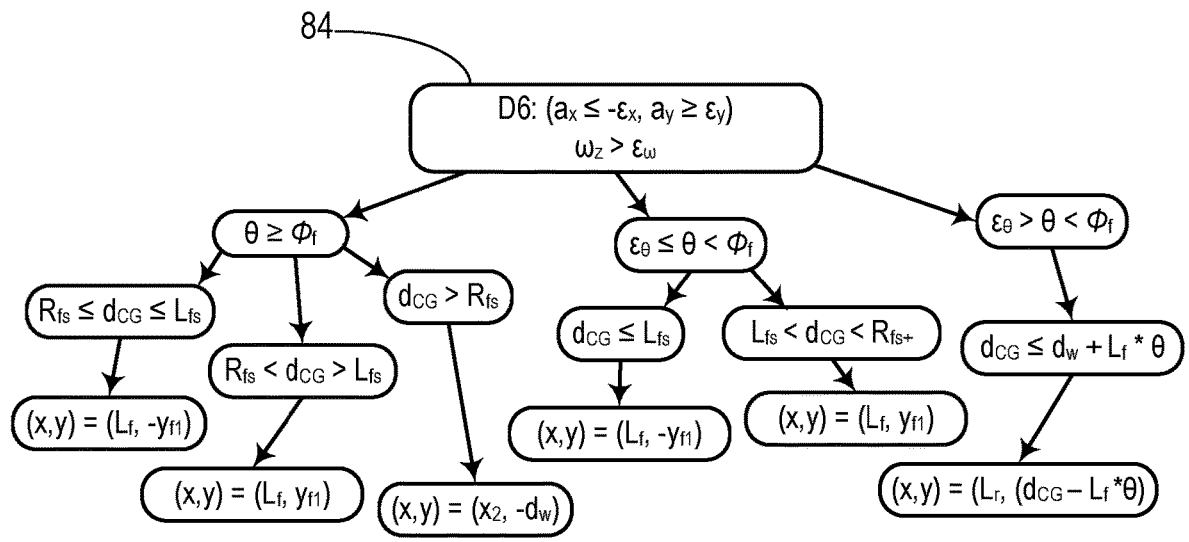
FIG. 23 is a decision tree for identifying coordinates of an impact location in a northeast quadrant when yaw rate is positive.
Figure 25:
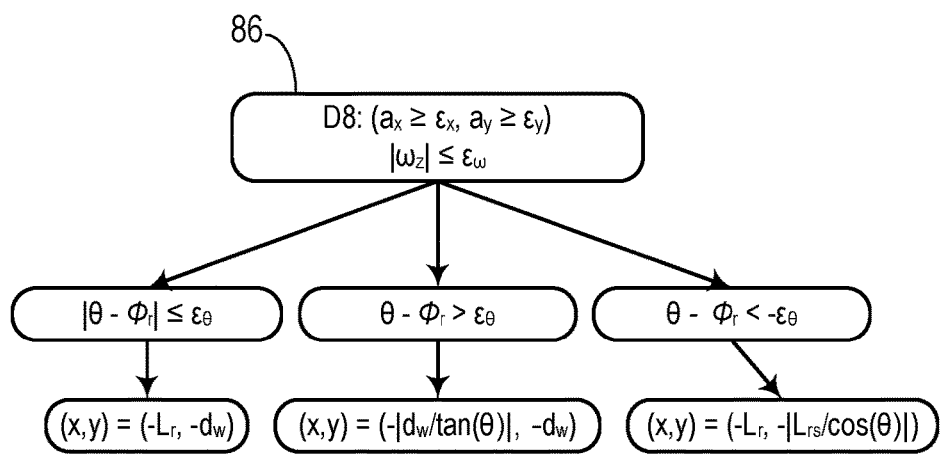
FIG. 25 is a decision tree for identifying coordinates of an impact location in a southeast quadrant when yaw rate is close to zero.
Figure 24:
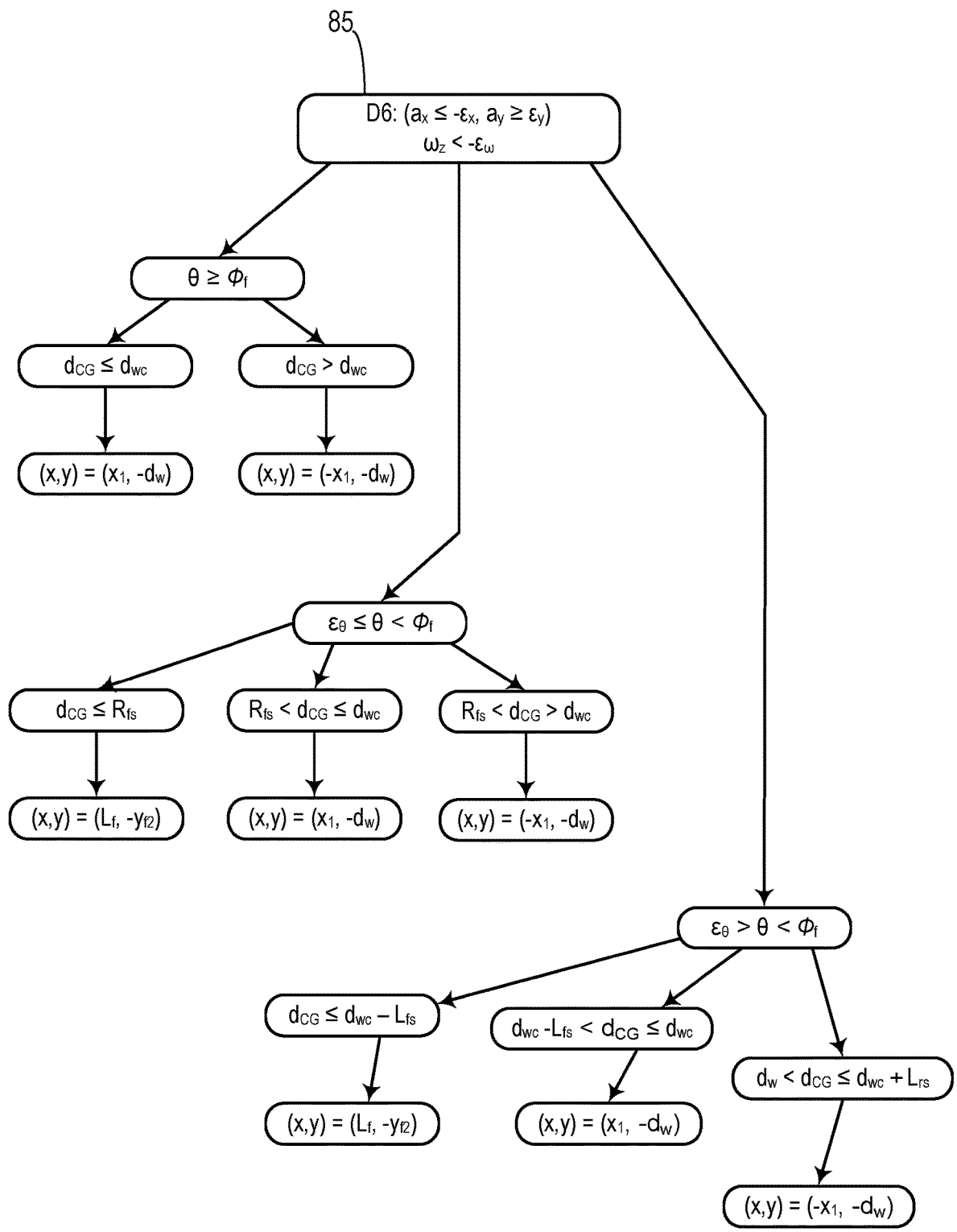
FIG. 24 is a decision tree for identifying coordinates of an impact location in a northeast quadrant when yaw rate is negative.
Figure 26:
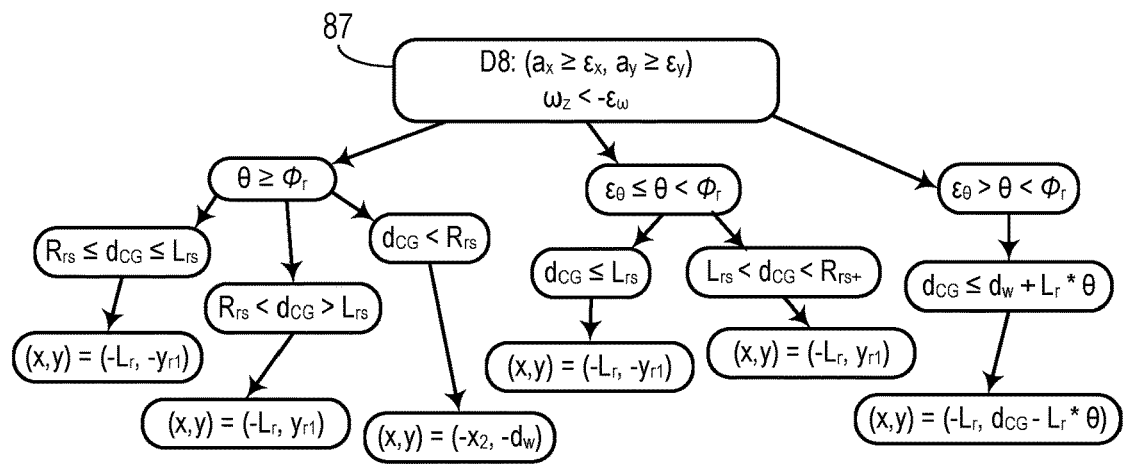
FIG. 26 is a decision tree for identifying coordinates of an impact location in a southeast quadrant when yaw rate is negative.
Figure 27:
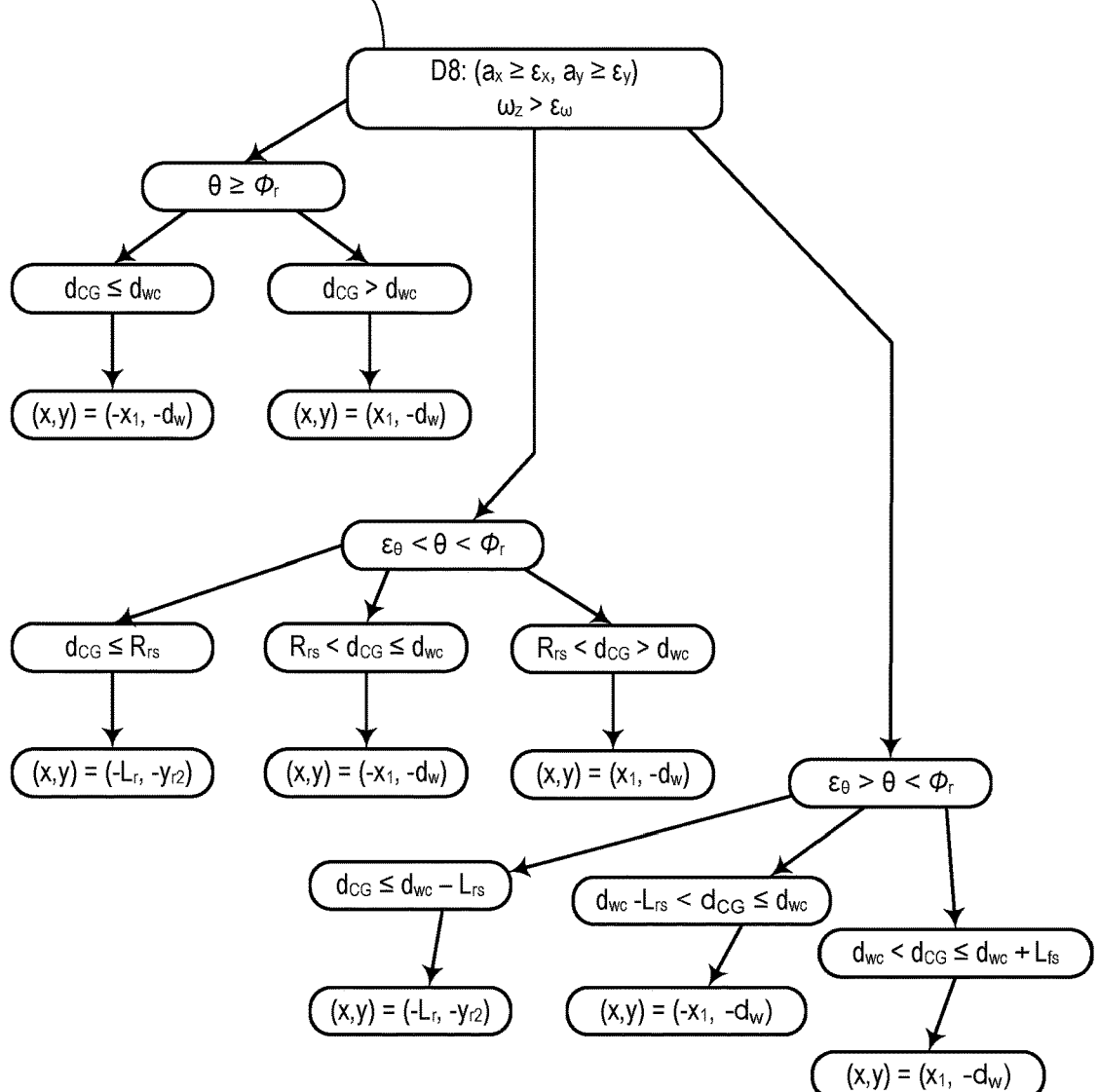
FIG. 27 is a decision tree for identifying coordinates of an impact location in a southeast quadrant when yaw rate is positive.

When the special case is not found, then impact distance $d_{CG}$ is calculated and the geometric projections based on impact angle $\theta$ are determined. In a preferred embodiment, the geometric analysis may preferably be organized according to the quadrant in which the total acceleration direction occurs. Thus, FIGS. 16-18 yield the impact coordinates when the impact direction falls in quadrant D2. FIGS. 19-21 yield the impact coordinates when the impact direction falls in quadrant D4. FIGS. 22-24 yield the impact coordinates when the impact direction falls in quadrant D6. FIGS. 25-27 yield the impact coordinates when the impact direction falls in quadrant D8.

Figure 16:
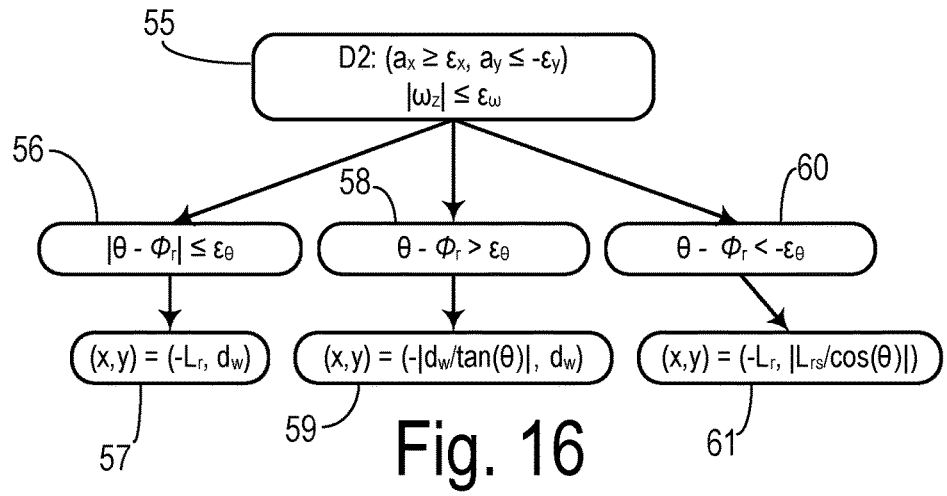
FIG. 16 is a decision tree for identifying coordinates of an impact location in a southwest quadrant when yaw rate is close to zero.
Figure 17:
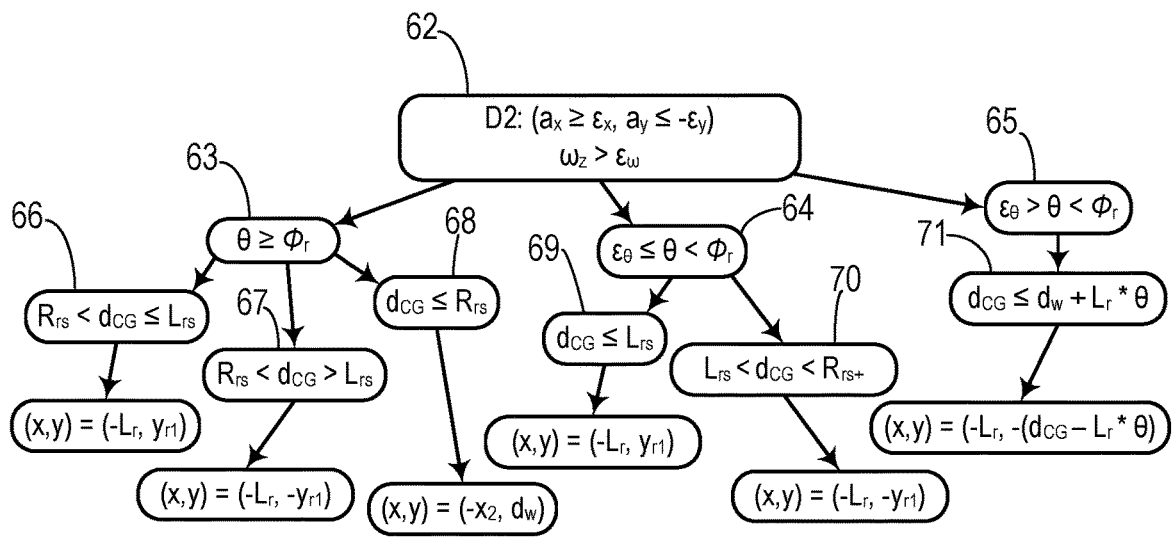
FIG. 17 is a decision tree for identifying coordinates of an impact location in a southwest quadrant when yaw rate is positive.
Figure 18:
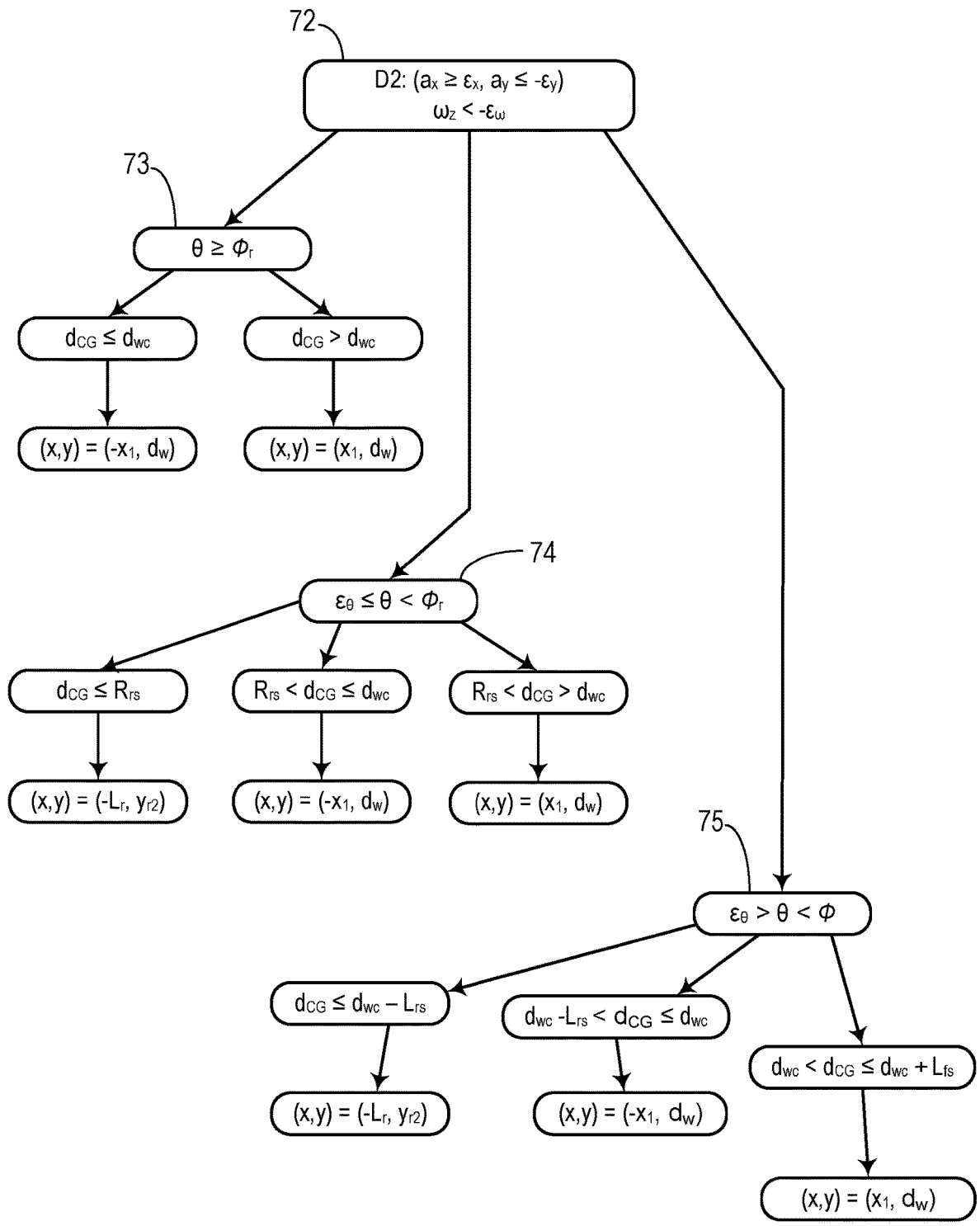
FIG. 18 is a decision tree for identifying coordinates of an impact location in a southwest quadrant when yaw rate is negative.

When acceleration falls in quadrant D2 because $a_x \geq \varepsilon_x$ and $a_y \leq -\varepsilon_y$, then a corresponding one of FIGS. 16-18 is selected for finding the impact coordinates based on the sign of yaw rate $\omega$. The sign can be positive (i.e., $\omega > \varepsilon_\omega$), negative (i.e., $\omega < -\varepsilon_\omega$, or none (i.e., $|\varepsilon| \leq \varepsilon_\omega$). As shown in box 55 in FIG. 16, when acceleration is in quadrant D2 and the sign of the yaw rate is zero ($|\omega| \leq \varepsilon_\omega$) then a geometric comparison based on the difference between impact angle $\theta$ and vehicle corner angle $\phi_r$ in boxes 56, 58, and 60 determine whether the impact coordinates are determined according to the potential values from boxes 57, 59, and 61, respectively.

When acceleration is in quadrant D2 and the sign of the yaw rate is positive ($\omega > -\varepsilon_\omega$) as shown in box 62, then the impact coordinates are found using FIG. 17. A geometric comparison between impact angle $\theta$ and vehicle corner angle $\phi_r$ in boxes 63-65 determine a choice of subsequent comparisons between impact distance $d_{CG}$ and various ones of the projections shown in boxes 66-71. The results of the chosen comparisons determine the impact coordinates selected as the final values as shown in FIG. 17.

When acceleration is in quadrant D2 and the sign of the yaw rate is negative ($\omega < -\varepsilon_\omega$) as shown in box 72, then the impact coordinates are found using FIG. 18. Geometric comparisons between impact angle $\theta$ and vehicle corner angle $\phi_r$ are performed in boxes 73-75 (the same comparisons as in boxes 66-71 in FIG. 17) determine a choice of subsequent comparisons between impact distance $d_{CG}$ and various ones of the projections as shown. The box for which the chosen comparison is true determines which impact coordinates are selected as the final values for x and y.

When acceleration falls in quadrant D4 because $a_x \leq -\varepsilon_x$ and $a_y \leq -\varepsilon_y$, then a corresponding one of FIGS. 19-21 is selected for finding the impact coordinates based on the sign of yaw rate $\omega$. When yaw rate is near zero as shown in box 80, then a geometric comparison based on the difference between impact angle $\theta$ and vehicle corner angle $\phi_r$ identifies which set of impact coordinates are selected as shown. When yaw rate is negative ($\omega<-\varepsilon_\omega$) as shown in box 81, then the impact coordinates are found using FIG. 20. Geometric comparisons between impact angle $\theta$ and vehicle corner angle $\phi_r$ determine a choice of subsequent comparisons between impact distance $d_{CG}$ and various ones of the projections as shown. The box for which the chosen comparison is true determines which impact coordinates are selected as the final values for x and y. When the sign of the yaw rate is positive ($\omega>\varepsilon_\omega$) as shown in box 82, then the impact coordinates are found using FIG. 21. A geometric comparison between impact angle $\theta$ and vehicle corner angle $\phi_r$ determines a choice of subsequent comparisons between impact distance $d_{CG}$ and various ones of the projections. The results of the chosen comparisons determine the impact coordinates selected as the final values as shown in FIG. 21.

When acceleration falls in quadrant D6 because $a_x \leq -\varepsilon_x$ and $a_y \geq \varepsilon_y$, then a corresponding one of FIGS. 22-24 is selected for finding the impact coordinates based on the sign of yaw rate $\omega$. When yaw rate is near zero as shown in box 83, then a geometric comparison based on the difference between impact angle $\theta$ and vehicle corner angle $\phi_r$ identifies which set of impact coordinates are selected as shown. When the sign of the yaw rate is positive ($\omega>\varepsilon_\omega$) as shown in box 84, then the impact coordinates are found using FIG. 23. A geometric comparison between impact angle $\theta$ and vehicle corner angle $\phi_r$ determines a choice of subsequent comparisons between impact distance $d_{CG}$ and various ones of the projections. The results of the chosen comparisons determine the impact coordinates selected as the final values for x and y. When yaw rate is negative ($\omega<-\varepsilon_\omega$) as shown in box 85, then the impact coordinates are found using FIG. 24. Geometric comparisons between impact angle $\theta$ and vehicle corner angle $\phi_r$ determine a choice of subsequent comparisons between impact distance $d_{CG}$ and various ones of the projections as shown. The box for which the chosen comparison is true determines which impact coordinates are selected as the final values for x and y.

When acceleration falls in quadrant D8 because $a_x \geq \varepsilon_x$ and $a_y \geq \varepsilon_y$, then a corresponding one of FIGS. 25-27 is selected for finding the impact coordinates based on the sign of yaw rate $\omega$. When yaw rate is near zero as shown in box 86, then a geometric comparison based on the difference between impact angle $\theta$ and vehicle corner angle $\phi_r$ identifies which set of impact coordinates are selected as shown. When yaw rate is negative ($\omega<-\varepsilon_\omega$) as shown in box 87, then the impact coordinates are found using FIG. 26. Geometric comparisons between impact angle $\theta$ and vehicle corner angle $\phi_r$ determine a choice of subsequent comparisons between impact distance $d_{CG}$ and various ones of the projections as shown. The box for which the chosen comparison is true determines which impact coordinates are selected as the final values for x and y. When the sign of the yaw rate is positive ($\omega>\varepsilon_\omega$) as shown in box 88, then the impact coordinates are found using FIG. 27. A geometric comparison between impact angle $\theta$ and vehicle corner angle $\phi_r$ determines a choice of subsequent comparisons between impact distance $d_{CG}$ and various ones of the projections. The results of the chosen comparisons determine the impact coordinates selected as the final values as shown in FIG. 27.

What is claimed is:

1. A crash detection method in a road vehicle, comprising:
   (a) measuring lateral acceleration, longitudinal acceleration, and yaw rate during operation of the vehicle, wherein the lateral and longitudinal accelerations define a total acceleration;
   (b) detecting occurrence of an impact by comparing the total acceleration to an impact threshold;
   (c) determining an impact angle according to an arctangent of a ratio of the lateral and longitudinal accelerations;
   (d) determining a center-of-gravity to impact distance according to a mass of the vehicle, a moment of inertia of the vehicle, the measured accelerations, and the yaw rate; and
   (e) when the yaw rate is less than a yaw threshold and the impact angle is within a predetermined range of an integer multiple of 90°, then determining an impact location in response to a projection of the center-of-gravity to impact distance selected according to signs of the lateral and longitudinal accelerations, otherwise determining the impact location in response to the projection of the center-of-gravity to impact distance selected according to the signs of the lateral and longitudinal accelerations and a sign of the yaw rate.

2. The method of claim 1 wherein the selected projection is chosen from a plurality of trigonometric projections based on the impact angle and predetermined dimensions of the vehicle.

3. The method of claim 2 wherein the predetermined dimensions include distances from a center-of-gravity to a vehicle front, a vehicle rear, a vehicle side, and vehicle corners, and wherein the predetermined dimensions further include angles defined by lines between the vehicle side, the center-of-gravity, and the vehicle corners.

4. The method of claim 1 further comprising:
   storing the impact location in a nonvolatile memory; and
   wirelessly transmitting the impact location and a plurality of vehicle status parameters to a remote accident monitoring database.

5. The method of claim 1 wherein the vehicle includes a passive restraint system for deploying a restraint to protect an occupant of the vehicle, wherein the method further comprises:
   adapting deployment of the restraint in response to the impact location.

6. The method of claim 1 wherein the occurrence of the impact is further detected by comparing the yaw rate to the yaw threshold.

7. A vehicle apparatus comprising:
   vehicle dynamics sensors measuring lateral acceleration, longitudinal acceleration, and yaw rate, wherein the lateral and longitudinal accelerations define a total acceleration;
   a controller network with at least one controller module communicatively coupled to the dynamics sensors, wherein the controller network:
   a) detects occurrence of an impact by comparing the total acceleration to an impact threshold;
   b) determines an impact angle according to an arctangent of a ratio of the lateral and longitudinal accelerations;
   c) determining a center-of-gravity to impact distance according to a mass of the vehicle, a moment of inertia of the vehicle, the measured accelerations, and the yaw rate; and
   d) when the yaw rate is less than a yaw threshold and the impact angle is within a predetermined range of an integer multiple of 90°, then determines an impact location in response to a projection of the center-of-gravity to impact distance selected according to signs of the lateral and longitudinal accelerations, otherwise determines the impact location in response to the projection of the center-of-gravity to impact distance selected according to the signs of the lateral and longitudinal accelerations and a sign of the yaw rate.

8. The vehicle apparatus of claim 7 further comprising non-volatile storage for recording the impact location and data associated with the impact including a time, a date, and a location.

9. The vehicle apparatus of claim 7 further including a passive restraint system for deploying a restraint to protect an occupant of the vehicle, wherein the passive restraint system adapts deployment of the restraint in response to the impact location.

10. The vehicle apparatus of claim 7 wherein the selected projection is chosen from a plurality of trigonometric projections based on the impact angle and predetermined dimensions of the vehicle.

11. The vehicle apparatus of claim 10 wherein the predetermined dimensions include distances from a center-of-gravity to a vehicle front, a vehicle rear, a vehicle side, and vehicle corners, and wherein the predetermined dimensions further include angles defined by the vehicle side, the center-of-gravity, and the vehicle corners.

12. The vehicle apparatus of claim 7 wherein the controller network further detects the occurrence of the impact by comparing the yaw rate to the yaw threshold.

13. The vehicle apparatus of claim 7 further comprising a wireless transmitter for wirelessly transmitting the impact location and a plurality of vehicle status parameters to a remote accident monitoring database, wherein the controller network encodes the impact location according to a location-direction-yaw code for providing a low transmission overhead.

* * * * *